INVENTORS:
H. L. SHATTO, JR.
J. R. DOZIER
BY: Theodore E. Bieber
THEIR ATTORNEY

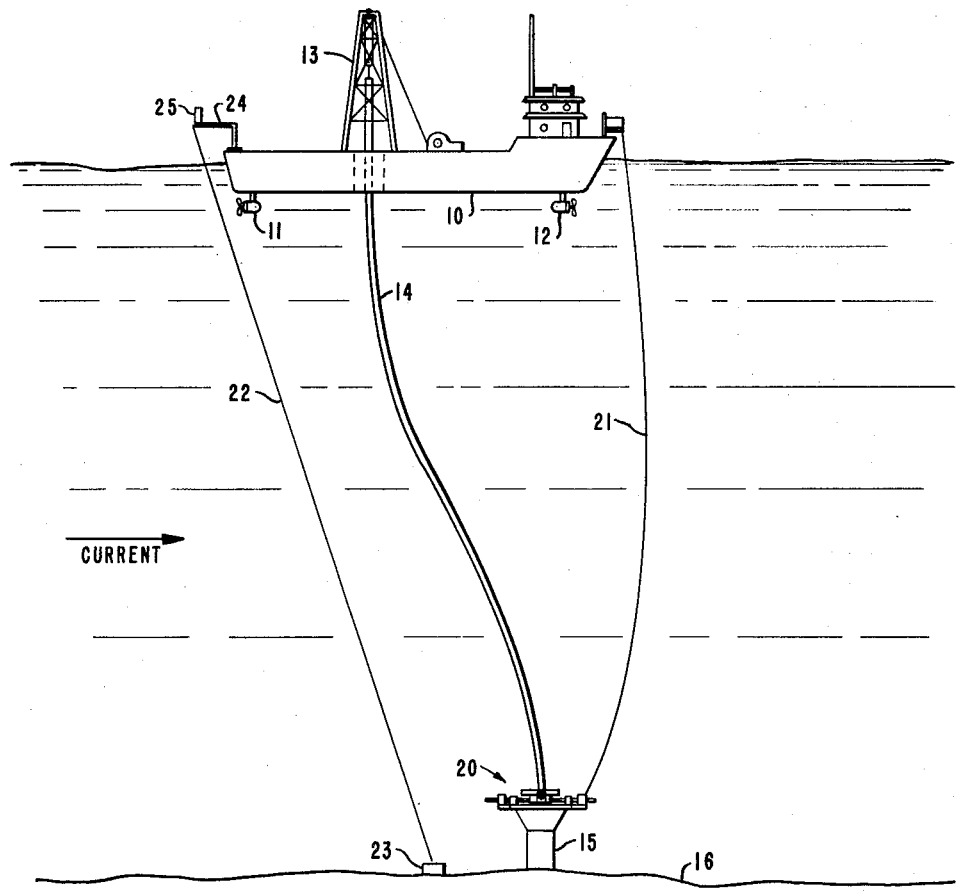
FIG. 1
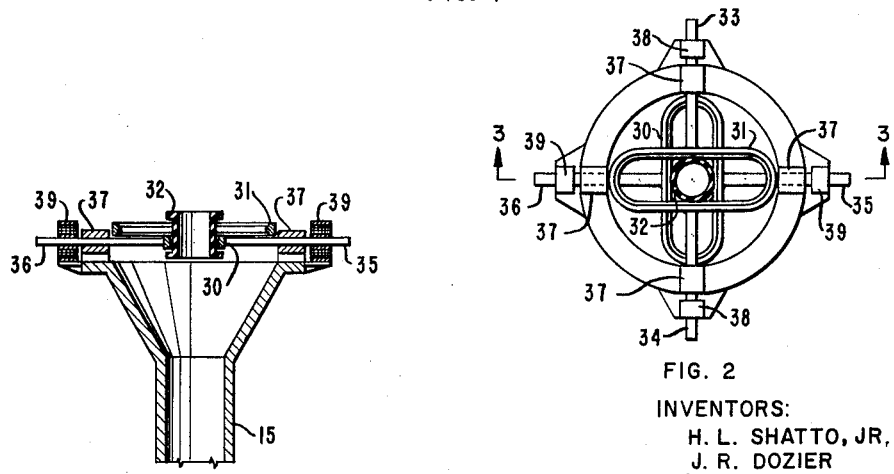
FIG. 3
FIG. 2
INVENTORS:
H. L. SHATTO, JR,
J. R. DOZIER
BY: *Theodore E. Bieber*
THEIR ATTORNEY Sept. 15, 1964  H. L. SHATTO, JR., ETAL  3,148,653
SHIP POSITIONING
Filed May 17, 1962  2 Sheets-Sheet 2

United States Patent Office 3,148,653
Patented Sept. 15, 1964

3,148,653
SHIP POSITIONING
Howard L. Shatto, Jr., Palos Verdes, and James Ronald Dozier, Whittier, Calif., assignors to Shell Oil Company, New York, N.Y., a corporation of Delaware
Filed May 17, 1962, Ser. No. 195,645
5 Claims. (Cl. 114—144)

This invention pertains to dynamic ship positioning and more particularly to a system having two stages of control in which the ship is positioned by a secondary control having fast response to ship displacements with respect to a fixed bottom location with the set point of said secondary control being adjusted by a primary control having a slower response to another reference, more particularly, the primary control responses relative horizontal position between two objects, one of which is guided or suspended from the ship.

A specific example of the application of this invention is the drilling of offshore oil wells in deep water. In drilling deep water wells it may be desirable to drill from a floating vessel that is positioned over a wellhead located on the ocean floor. Previously the vessel was normally anchored over the wellhead to maintain it in position but the use of anchors is limited to rather shallow depths. As drilling operations are conducted in deeper water, it may be desirable to maintain the vessel dynamically positioned over the wellhead. In the copending application of H. L. Shatto and J. R. Dozier, Serial No. 95,601, filed March 14, 1961, entitled "Ship Positioning," there is described a system for dynamically positioning the vessel over the wellhead. The system described in this copending application utilizes a plurality of propulsion means which may be similar to outboard motors. These individual propulsion means are directed and their speed controlled to maintain the vessel over the wellhead. A tiltmeter means is used to detect any drift of the vessel from the desired location by sensing the angular deflection of a taut line that extends from the vessel to a position on the ocean floor bearing a fixed relationship to the wellhead.

While the system of the above copending application provides a satisfactory method for dynamically positioning a floating drilling vessel over a wellhead it is not suitable for all conditions encountered in offshore drilling. For example, when a strong current is flowing, the current can bend the drill pipe and cause serious stresses in the drill pipes even though the vessel is maintained directly over the wellhead. To minimize the strain on the drill pipe it is necessary to displace the vessel from the wellhead and allow the drill pipes to enter the wellhead substantially coaxially with the wellhead. With the system of the copending application, it was impossible to determine the required amount of displacement and thus it could only be estimated in a very crude manner.

Accordingly, it is a principal object of this invention to provide a 2-stage control system for dynamically positioning a drilling vessel over a submerged wellhead that utilizes a fast response control system for positioning the vessel and a slow response control system for controlling the set point of the fast response control system.

A further object of this invention is to provide a 2-stage control system for dynamically positioning a drilling vessel over a submerged well and in which the fast response control system responds to the position of the vessel with respect to a fixed location bearing a fixed relation to the wellhead and the slow response system responds to the position of the drill pipe in the wellhead.

The above objects and advantages of this invention are achieved by utilizing the control system of the above-referenced copending application to position the drilling vessel over the submerged wellhead. Detecting means are provided for determining the displacement of the drill pipe with respect to the wellhead as the drill pipe enters the submerged wellhead. The signals from the position detecting means are then fed into controllers for error signal generations and a related output. The controller output is then resolved to coincide with the longitudinal and athwartships axes of the drilling vessel. The adjusting signals are then used to control the set points of the controllers used in the copending system.

Thus, the present invention utilizes a similar control system to that described in the copending application Serial No. 95,601 for secondary control of the vessel. To this secondary control system is added a primary control system that responds to error signals of pipe displacement with respect to the wellhead. The output of the primary control system adjusts the set point of the secondary control system. The primary drill pipe control is slow in responding to ship movement and is therefore unsatisfactory for complete ship control. The secondary ship control has a fast response to ship placement but cannot detect the relative position of the drill pipe with respect to the wellhead. The combination of these two stages of control provides for fast, effective control of the ship with minimum drill pipe stress at the ocean floor.

This is but one example of the usage of this invention. Other usages might use the relative horizontal position of other objects, such as undersea vehicles with respect to fixed or slowly moving objects for the primary control reference.

The above objects and advantages of this invention will be more easily understood from the following description when taken in conjunction with the attached drawing in which:

FIGURE 1 is a vertical view showing the drilling vessel positioned over a submerged wellhead;

FIGURE 2 is a plan view showing the details of the means used for detecting the displacement of the drill string;

FIGURE 3 is a vertical section taken along line 3—3 of FIGURE 2;

Figures 4, 5:
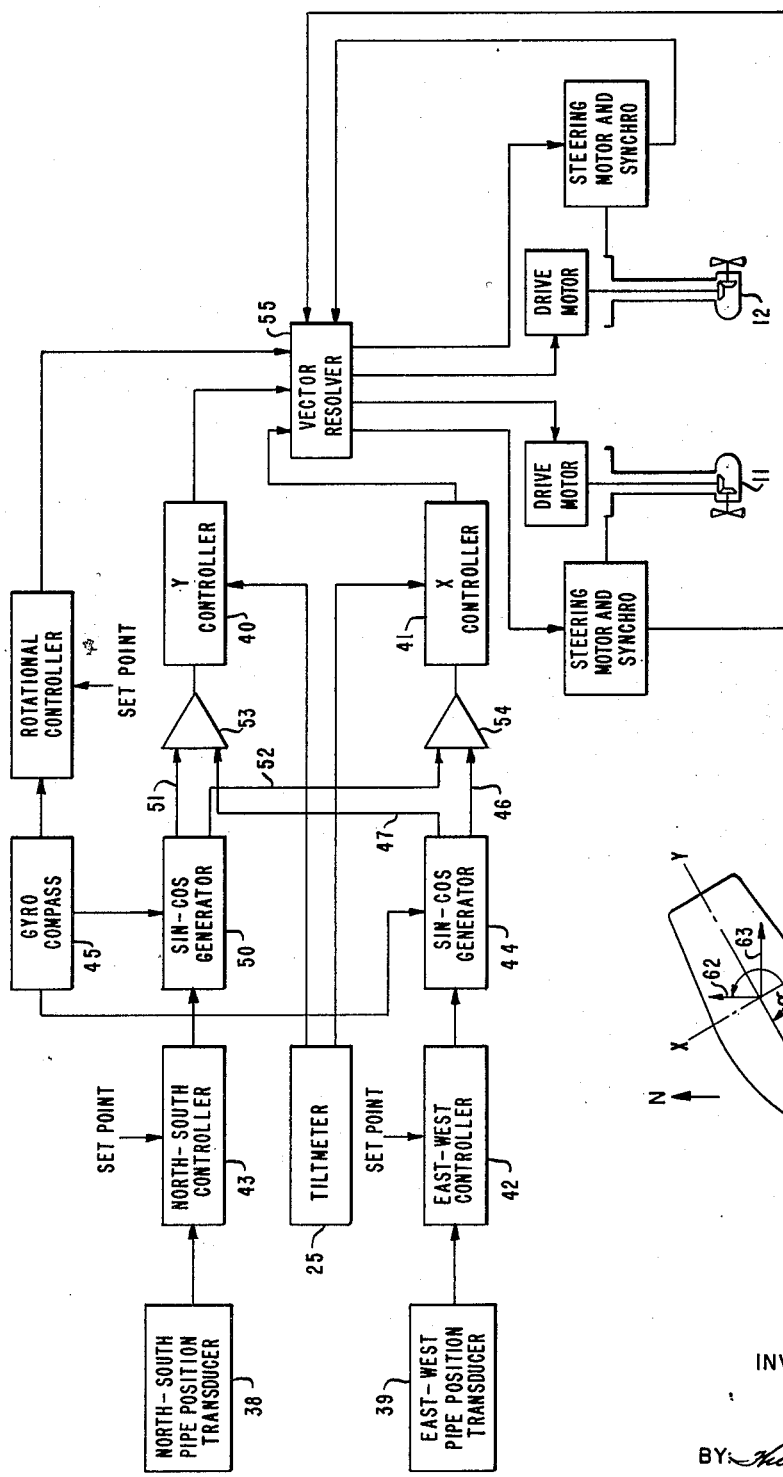
FIGURE 4 is a block diagram of the control system of this invention.
FIGURE 5 is a plan view of the drilling vessel showing the resolution of the various displacement vectors to position the vessel over the wellhead.

Referring now to FIGURE 1 there is shown a floating drilling vessel 10 having propulsion means 11 and 12 disposed at the ends thereof. The propulsion means preferably have a system for varying the thrust as well as a means for varying the direction of thrust. Suitable propulsion means are outboard motor drives or the like. The drilling vessel is provided with a drill rig 13 that is positioned over an opening formed in the hull of the vessel. The drill pipe 14 extends through the opening in the hull on the vessel 10 to the submerged wellhead 15. The wellhead 15 is disposed on the floor 16 of the body of water and is anchored in a fixed position by suitable means not shown.

The vessel is maintained in the desired posititon by a control system that measures the angular deflection of a taut line 22 that extends from the vessel 10 to an anchored position 23 on the floor 16 of the body of water. The position 23 may be an anchoring position on the wellhead 15, or an anchor that is positioned in a known relationship to the wellhead 15. The angular deflection of the line 22 is sensed by a tiltmeter means 25 that is mounted on a supporting arm 24 extending over the side of the vessel 10. A suitable tiltmeter and mounting means is shown and described in copending patent application, Serial No. 143,319, filed October 6, 1961, entitled "Ship Control Apparatus." The signals from the tiltmeter are supplied to a control system described below that in turn supply signals to control both the thrust and direction thereof of each of the propulsion units 11 and 12. The thrust of each of the propulsion units and its direction is controlled to maintain the vessel 10 in a desired position.

As shown in FIGURE 1, a current flow is assumed in the direction of the arrow and the drilling vessel is purposely displaced to the left against the force of the current. By displacing the vessel to the left with relation to the wellhead 15 the drill pipe 14 can assume a natural curve and enter the wellhead 15 substantially coaxially. It is preferred that the drill string enter the wellhead coaxially rather than an inclined direction to reduce the bending stresses in the drill string. The drill string 14 would enter the wellhead 15 in an inclined direction if the drilling vessel 10 was maintained directly over the wellhead 15. This inclination would result from the current flow bending the drill string 14. The drill string when bent would assume an arcuate form and thus enter the wellhead at an angle with respect to the wellhead.

Referring now to FIGURES 2 and 3, there is shown the detailed construction of a drill string position sensing means 20 that is disposed on the top of the wellhead 15. The position sensing means consists of a yoke 30 and 31 for each axis with a flexible inner liner 32 to allow the passage of collars. The drill string extends through the flexible liner 32 and is a tight fit therein. Two radial arms 33–36 for each yoke are supported for coaxial movement in bearing sleeves 37 on the wellhead 15. The radial arms are rigidly attached to the yoke thus any movement of the yokes will be resolved into cartesian movements of the radial arms. The movement of the radial arms is measured by linear position detecting means 38 and 39 disposed on the wellhead 15. It should be noted that the detecting means 38 detect movement of the drill string in a first direction while the detecting means 39 detect movement of the drill string at right angles to the first direction. These position detecting means may be differential transformers that provide an alternating current signal which is proportional to the displacement of the radial arms 32. Of course, other detecting means may be used to determine the displacement of the arms 33–36.

Referring now to FIGURE 4 there is shown a block diagram of a control system for combining the signals from the tiltmeter means with the signals from the drill pipe position detecting means. The signals from the tiltmeter 25 are supplied to two controllers 40 and 41. The controller 40 is a Y-axis controller with the Y axis conforming to the longitudinal axes of the drilling vessel 10 while the controller 41 is an X axis controller conforming to the athwartships axes of the drilling vessel. As explained in copending application, Serial No. 95,601, referred to above, the tiltmeter 25 is a pendulum operated device that detects the angular displacement of a guide line in two planes at substantially right angles to each other. In addition, the two planes are preferably aligned with the longitudinal and athwartships axes of the drilling vessel. The drill pipe position detecting means 38 and 39 are coupled to separate drill pipe controllers 42 and 43. It should be noted that the drill string detecting means 38 are labeled east-west position detecting means while drill string detecting means 39 are labeled north-south detecting means. The detecting means 38 and 39 should be rotated on the wellhead 15 until the detecting means 38 is aligned in a substantial east-west direction and the detecting means 39 aligned in a north-south direction. While this is the preferred arrangement, other orientations may be used providing the geographical orientation of the detecting means is known and remains fixed. The controllers 42 and 43 each have a set point adjustment as well as a rate response and reset action. The set point adjustments permit the adjustment of the controllers to align the drill pipe coaxially with the wellhead. The controller 42 is coupled to a sine-cosine generator 44 that also receives a signal from a compass 45. The sine-cosine generator may be of any well known design, for example, a servo resolving unit of either the resistance or inductive type. Thus, the two output signals 46 and 47 from the sine-cosine generator will be essentially the east-west displacement signal of the drill pipe multiplied by the sine and cosine of the heading of the drilling vessel 10 as determined by the compass 45. In a similar manner the north-south control is coupled to a sine and cosine generator 50 which also receives the signal from the compass 45. Thus the sine and cosine generator 50 will supply two output signals 51 and 52 that are the north-south displacement signal of the drill pipe multiplied by the sine and cosine of the heading of the vessel 10.

The signal 51 from the sine-cosine generator 50 represents the north-south displacement signal multiplied by the cosine of the vessel's heading while the signal 47 represents the east-west displacement signal multiplied by the sine of the vessel's heading. These two signals are supplied to an adding amplifier 53 which provides an output signal related to the arithmetical sum of the two input signals. Similarly, the signal 52 represents the north-south displacement signal multiplied by the sine of the vessel's heading and the signal 46 represents the east-west displacement signal multiplied by the cosine of the vessel's heading. The signals 46 and 52 are supplied to an amplifier 54 which provides an output signal related to the arithmetical sum of the two input signals. The amplifier 53 output is connected to the controller 40 to control the set point of the controller 40 while the amplifier 54 controls the set point of the controller 41. The two controllers 40 and 41 are connected to a vector resolving unit 55, which also receives a signal from the compass 45. The vector resolver provides suitable output signals for controlling the drive motors and the steering motors of the two propulsion means 11 and 12. The steering motors of the two propulsion means provide signals to the vector resolving unit in order that they may reset themselves. The operation of the vector resolving unit and its operation of the propulsion means is more particularly described in copending patent application, Serial No. 95,601.

Referring now to FIGURE 5, there is shown a simplified diagram of the vessel positioning system described above. The tiltmeter and taught line 22 supply two displacement signals 60 and 61. The signal 60 is aligned with the athwartships or X-axis of the vessel 10, while the signal 61 is aligned with the longitudinal or Y axis of the vessel. The vector 62 represents the north-south displacement as sensed by the detectors 39 of FIGURE 2. Similarly, the vector 63 represents the east-west displacement as sensed by the detectors 38 of FIGURE 2. The angle $\alpha$ equals the heading of the vessel as determined by the compass 45. From an inspection of the diagram of FIGURE 5 it can be seen that the signal 62 multiplied by the sine of $\alpha$ will be the portion of the signal 62 that lies along the X axis while the signal 62 times the cosine of $\alpha$ gives the portion of the signal 62 along the Y axis. Similarly, the signal 63 times the cosine of $\alpha$ gives the portion of the signal 63 along the X axis while 63 times the sine of $\alpha$ gives the portion of the signal along the Y axis. Thus, if the two displacement signals are multiplied by the sine and cosine of the ship's heading and the signals properly combined one can obtain two signals that indicate the displacement of the drill string along the X and Y axes of the vessel. These signals are then with respect to the wellhead used to control the set point of the X and Y controllers 40 and 41. This results in the ship's position system continually moving the vessel against the current until the displacement signals from the drill pipe detector for the drill pipe are reduced to zero. Zero displacement of the drill string, of course, corresponds to a coaxial position of the drill string as it centers to the wellhead 15. Any additional displacement of the drill string will cause the system to readjust the set points of the two controllers. Accordingly, this system will continually adjust itself to maintain the drill string substantially coaxial as it enters the wellhead 15.

While the use of drill string deflection provides a simple means for adjusting the set points of the two controllers 40 and 41, it could not be used to position the vessel. This results from the fact that the deflection of the drill string as it enters the wellhead 15 responds slowly to the displacement of the vessel 10 from its desired position and thus is not suitable as a vessel positioning signal. Accordingly, the vessel 10 can be properly positioned by staging the system of the copending patent application, Serial No. 95,601, with the drill string deflection signals. This permits the ship's positioning system as controlled by the tiltmeter 25 and taught line 22 to react rapidly to any displacement of the vessel while at the same time providing a slow adjustment of the position of the vessel to allow the drill pipe to enter the wellhead 15 at the proper angle.

We claim as our invention:

1. A two-stage control system for dynamically stationing a drilling vessel over a well location, said system comprising:
   a drill pipe extending from said vessel to a wellhead disposed at said well location;
   a position locating means disposed to sense the displacement of the vessel from said well location along two fixed vessel reference axes that are oriented at a fixed angle with respect to each other;
   displacement detecting means disposed to sense the horizontal displacement of said drill pipe from a desired position along two horizontal wellhead axes that are oriented at a fixed angle with respect to each other;
   a drill pipe controller means, said displacement detecting means being connected to said drill pipe controller to derive a pipe displacement signal related to the difference between the displacement signals and a set point;
   a converter means, said drill pipe controller means being connected to said converter means to vectorially resolve the pipe displacement signal into components along said reference axes and supply related output signals;
   two vessel controller means, each of said vessel controller means having a set point, said vessel position locating means being connected to said two vessel controller means, one of said vessel controller means being disposed to supply an output signal related to the displacement along one vessel reference axis, the other of said controller means being disposed to supply an output signal related to the displacement along the other vessel reference axis;
   said converter means being connected to the two vessel controller means to adjust the respective set points of said vessel controllers to control the set points thereof in response to the displacement of the pipe string along said vessel reference axes;
   an actuating means, said actuating means controlling the thrust means of the vessel; said vessel controllers being coupled to an actuating means disposed to control the thrust means of the vessel to move said vessel to reduce said output signals to zero.

2. A two-stage control system for dynamically stationing a drilling vessel over a well location, said system comprising:
   a drill pipe extending from said vessel to a wellhead disposed at said well location;
   a position locating means disposed to sense the displacement of the vessel from said well location along two axes that are oriented with the longitudinal and athwartships axes of the vessel;
   a first horizontal displacement detecting means disposed on said wellhead to sense the displacement of said drill pipe from the center of said wellhead in a first direction, a second horizontal displacement detecting means disposed on said wellhead to sense the displacement of said drill pipe in a second direction at right angles to said first direction;
   first and second vessel controllers and first and second pipe controllers, each controller having at least a set point and means for comparing an input signal with said set point and supplying an output signal related to the difference between said set point and input signal;
   said vessel position detecting means being coupled to said first and second vessel controllers;
   said pipe displacement detecting means being coupled to said first and second pipe position controllers, the output signal from said first pipe controller being fed into a first circuit means, said circuit means multiplying said output signal by the sine and cosine of the angle between the longitudinal axis of the vessel and the first direction, the output signal from said second pipe controller being fed into a second circuit means, said second means multiplying said output signal by the sine and cosine of said angle;
   the sine function from the first circuit means being added to the cosine of the second circuit means and fed into said second vessel controller to adjust the set point thereof and said sine function from the second circuit means being added to the cosine of the first circuit means and fed into the said first vessel controller to adjust the set point thereof;
   a control means for the thrust means of said vessel, said first and second vessel controller means being coupled to means to the control means of the thrust means of said vessel to reduce the output signals of said first and second vessel controllers to zero.

3. A two-stage control system for dynamically stationing a vessel such that a member extending from said vessel may be positioned horizontally in a fixed relation to a location on the ocean bottom, said system comprising:
   a member extending from the vessel and bearing a determinable horizontal relationship to a fixed position on the ocean bottom;
   a first sensing means disposed on said member, said first sensing means detecting the horizontal position of said member with relation to said location and supplying a first signal related thereto;
   first and second controllers, said first sensing means being coupled to said first and second controllers to reference said first signal to the horizontal control coordinator of the vessel and supply second and third signals related thereto;
   third and fourth controllers having at least a set point adjustment, said first and second controllers being coupled to said third and fourth controllers to adjust the set points thereof;
   a second sensing means disposed to detect the position of said vessel with respect to a fixed location on the ocean bottom and supply fourth and fifth signals related to said detected position along the horizontal control coordinates of the vessel;
   said second sensing means being connected to the input of said third and fourth controllers and said third and fourth actuators disposed to control the propulsion means thereof controllers being connected to said actuators to control the propulsion means of the vessel to reduce the error signals of said third and fourth controllers to zero.

4. A two-stage control system for dynamically positioning a floating drilling vessel such that a drill pipe extending from the vessel to a well head located on the ocean floor will be maintained in a predetermined horizontal position with relation to the wellhead, said system comprising:
   a first sensing means disposed on the wellhead, said first sensing means detecting the horizontal position of said drill pipe and supplying a first signal related thereto;

a drill pipe controller means having a set point representing the desired horizontal position of the drill pipe, said drill pipe controller means being coupled to said first sensing means to compare said first signal with said set point and supply a second signal related to the difference;

a second sensing means disposed on the vessel, said second sensing means detecting the position of the vessel and supply a third signal related to said detected position;

a vessel controller means having a set point, said drill pipe controller being coupled to said vessel controller means to adjust the set point of said vessel controller in response to said second signal, said second sensing means being coupled to said vessel controller means, said vessel controller means comparing said third signal with the set point of said vessel controller and supply a fourth signal related to the difference; and, a thrust means disposed on said vessel and having a thrust actuating means, said vessel controller means being coupled to said actuating means to operate said actuating means in response to said fourth signal.

5. The system of claim 4 in which:

said first sensing means detects the position of the drill pipe along two horizontal axes at right angles to each other and supplies related signals and the second sensing means detects the position of the vessel along two additional axes at right angles to each other, and supplies related signals; and, a circuit means coupled to said first sensing means for converting the signals related to the detected position of the drill pipe along said two axes to related signals along said two additional axes.

References Cited in the file of this patent

UNITED STATES PATENTS

| | | |
|---|---|---|
| 2,650,046 | Vanderlip | Aug. 25, 1953 |
| 2,873,075 | Mooers et al. | Feb. 10, 1959 |
| 2,987,027 | Wanzer | June 6, 1961 |
| 3,010,214 | Postlewaite | Nov. 28, 1961 |